Patented Jan. 6, 1953

2,624,694

UNITED STATES PATENT OFFICE 2,624,694

REMOVAL OF HYDROGEN SULFIDE

Howard R. Sailors, Bartlesville, Okla., assignor to Phillips Petroleum Company, a corporation of Delaware Application May 27, 1946, Serial No. 672,537

3 Claims. (Cl. 196—28)

The present invention relates to the removal of hydrogen sulfide from fluids containing the same. In a particular aspect, this invention relates to the treatment of hydrocarbon fluids for the removal of hydrogen sulfide. In a more specific embodiment, this invention relates to the removal of hydrogen sulfide from hydrocarbon gases and liquids by contact with a solution of cadmium sulfate in sulfuric acid solution.

Hydrogen sulfide is found as an undesirable constituent in various compositions, such as industrial gases, fuel gases, coal distillation gases, decomposition gases, hydrocarbon gases and liquids, etc. In petroleum operations, hydrogen sulfide is found as a contaminant in numerous streams. Hydrogen sulfide is found in natural gas, and is formed in cracking and/or desulfurization of hydrocarbons containing sulfur compounds. The corrosiveness, malodorousness, and other deleterious properties of hydrogen sulfide make it desirable, and usually necessary, to remove this compound from streams containing it in some stage of processing. The presence of hydrogen sulfide in natural gas and other hydrocarbon gases and liquids such as those associated with the production and refining of crude petroleum oil is objectionable from the standpoint of many domestic and industrial uses, and the removal of hydrogen sulfide from said gases is a matter of long recognized economic importance.

Heretofore the majority of processes for the removal of hydrogen sulfide from fluids have been based on two fundamental reactions, namely the action of metals and/or metal salts in solid form to fix hydrogen sulfide as metal sulfides, and the action of alkaline reagents or solutions to form salts with the acidic hydrogen sulfide, such as aqueous solutions of sodium or potassium carbonate or of caustic. The first mentioned type involves either discarding the spent reagent or else regeneration by relatively expensive and inefficient means. The second type of removal process usually includes a regeneration cycle wherein absorbed hydrogen sulfide is at least partially displaced from the alkaline reagent by conventional means to prepare said reagent for further use, but with a rather expensive loss of reagent. Also, equilibrium conditions in the absorption reaction with alkaline solutions prevent complete removal of the hydrogen sulfide. A third type of desulfurization is absorption by organic basic reagents, such as an ethanolamine, which are usually soluble in liquid hydrocarbons and thus are not well suited to removal of hydrogen sulfide from such streams, since high losses of reagent in the treated stream also make such operations uneconomical.

It is therefore an object of this invention to provide an efficient process for the desulfurization of fluids.

Another object is to provide an economical, continuous process for the removal of sulfide gases from hydrocarbon fluids.

A further object of the invention is to provide a novel process for treatment of fluids containing hydrogen sulfide with a solution of cadmium sulfate in sulfuric acid.

A still further object is to provide a continuous process for the desulfurization of fluids containing hydrogen sulfide and the regeneration of the desulfurizing reagent.

Another object is to treat hydrocarbon fluids containing hydrogen sulfide with a solution of cadmium sulfate in sulfuric acid for the removal of the sulfide gas and to regenerate the solution and liberate the hydrogen sulfide.

Other objects will be apparent to one skilled in the art from the disclosure and the accompanying drawings which represent two embodiments of the present invention.

Figure 1:
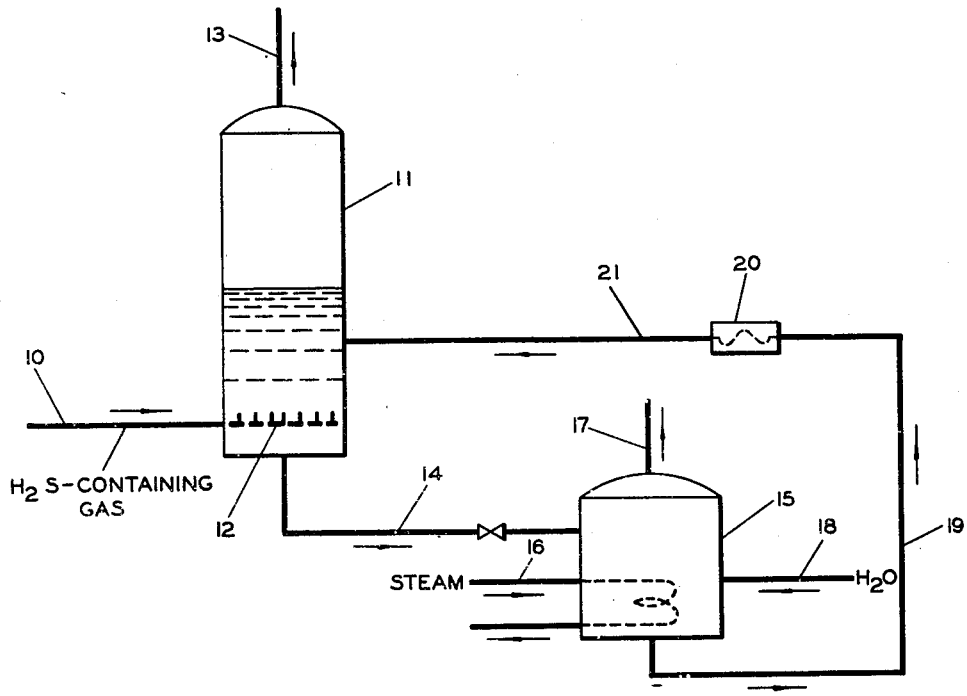
Figure 1 is a diagrammatical view of one embodiment of the present invention for treating sulfide-containing gases.

I have now discovered that a solution of cadmium sulfate in aqueous sulfuric acid will remove hydrogen sulfide from saturated and/or non-reactive hydrocarbon streams and from other fluids containing the sulfide gas and that the reagent after use is regenerable by heating. Under certain conditions of temperature, pressure and concentration of acid substantial quantities of cadmium sulfate are soluble in sulfuric acid. Under these same conditions, the dissolved cadmium sulfate will react with hydrogen sulfide to form cadmium sulfide which precipitates. The precipitate is decomposed by heating the acid solution containing the cadmium sulfide, and cadmium sulfate is re-formed from the cadmium sulfide with the liberation of hydrogen sulfide. The process may be operated as a continuous process with the contact of fluid and reagent, the separation after contact, and the heating and reformation of the cadmium sulfate reagent being accomplished in separate steps.

The solution of cadmium sulfate in aqueous sulfuric acid is suitable for treating either gaseous or liquid streams that contain hydrogen sulfide. As the reagent is readily regenerated for further use, reagent replacement is not a problem, and thus is an economical method for hydrogen sulfide removal. The cadmium sulfide, a precipitate, formed by the reaction of cadmium sulfate and hydrogen sulfide in the cold aqueous sulfuric acid is converted to cadmium sulfate on heating the precipitate in the aqueous acid, the hydrogen sulfide formed being expelled from the solution.

The most critical conditions for the successful operation of the process are the temperature in the absorption zone and the concentration of the acid. At extreme lower concentrations of acid strength more cadmium sulfate is soluble in the acid and more rapid reduction of the hydrogen sulfide to cadmium sulfide is possible. However, below certain concentrations of acid, cadmium sulfate will not be effectively re-formed from the cadmium sulfide in the presence of the acid even at temperatures beyond the range at which it is desirable to operate the present invention. On the other hand, cadmium sulfide is relatively easily converted into cadmium sulfate in highly concentrated sulfuric acid, but the solubility of the sulfate salt is greatly reduced and the extent of reaction forming cadmium sulfide from hydrogen sulfide in the presence of the acid is lowered. Thus a satisfactory concentration of the acid is between the extremes of concentration, i. e., between about 25 and 75 per cent sulfuric acid by weight, preferably about 40 to 60 weight per cent sulfuric acid. The concentration of cadmium sulfate dissolved in the acid is preferably slightly below saturation at ordinary temperatures to prevent precipitation and loss of the sulfate salt. The temperature in the absorption zone may be in the range of 0 to 150° F., preferably below 125° F. The pressure is not critical and depends somewhat upon the pressure of the feed stock which needs to be only sufficiently above atmospheric to force the fluid through the system. Higher pressures may, of course, be used if desired. Temperature in the regenerating zone will vary, depending upon the concentration of the acid. As already discussed, re-formation of the sulfate reagent is more easily accomplished when the concentration of the acid is higher. Ordinarily, temperatures between about 200 and 300° F. are satisfactory to promote the regeneration of the reagent.

Figure 1 illustrates one embodiment in which hydrogen sulfide may be removed from a gaseous stream by the present invention. A hydrogen sulfide-containing gas, such as a natural gas or gaseous products from hydrocarbon cracking, may be introduced through line 10 to an absorption tower 11. The gas is introduced into the bottom of the tower through multiple nozzles 12 below the surface of the reagent solution through which the gas is bubbled. Treated gases are removed overhead through line 13 to storage, use or further treatment, leaving behind in the acid reagent solution the hydrogen sulfide which has reacted with the cadmium sulfate to form cadmium sulfide and sulfuric acid. As the cadmium sulfate solution becomes spent, the solution with the admixed cadmium sulfide is removed by line 14 to a regeneration vessel 15 where the mixture is heated, as by steam coils 16. In the regeneration the cadmium sulfide is converted into cadmium sulfate which remains dissolved in the sulfuric acid solution and into hydrogen sulfide as described above. The hydrogen sulfide and some water vapor are removed through line 17. Water lost through vaporization may be replaced by the addition of sufficient water through line 18 to maintain the desired acidity of the reagent solution. The regenerated solution may be withdrawn through line 19 to a cooler 20 in which it is cooled to the temperature which is being used in the absorption zone. From cooler 20 the regenerated solution may be returned to the absorption zone 11 through line 21.

The contact zone as illustrated by an absorption tower may be a simple elongated tower with nozzles in the bottom through which gases are introduced and allowed to bubble up through the reagent or the tower may have incorporated therein a means of agitation of the reagent, as by a stirrer, or a means for increasing the time and extent of contact of the gas passing through, as by inert packing within the tower. The liquid reagent may, if desired, be introduced and passed in countercurrent contact with the gas in a continuous flow. The upper section of the tower should be left empty to prevent entrainment of the solution in the gas removed from the tower. Also, a mist extractor (not shown) may be included to remove any entrained solution which may be carried by the gas at the tower exit.

Figure 2:
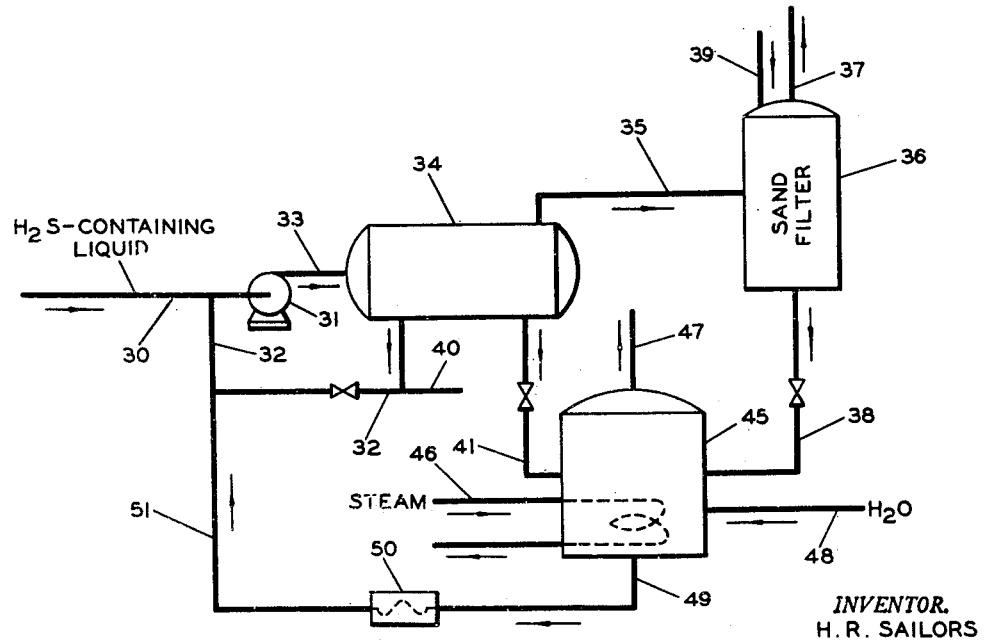
Figure 2 is a diagrammatical view of an embodiment of the invention for treating sulfide-containing liquids.

The treatment of a liquid by this invention involves substantially the same steps as described for the treatment of a gas. Figure 2 shows one method of treating a liquid according to the invention. A hydrogen sulfide-containing liquid, such as a hydrocarbon stream, may be introduced by line 30 into a mixing pump 31 where it is contacted with the cadmium sulfate-sulfuric acid solution recycled through line 32 and the regenerated cadmium sulfate reagent from line 51. Additional or make-up solution may be added through line 40, as required. After thorough contact and reaction in the mixing pump the mixture of treated liquid and reagent is directed by line 33 to a settling tank 34 in which separation is effected by stratification. The acid reagent with the cadmium sulfide formed settles to the bottom and the liquid treated separates in a layer above the reagent. Separation is usually not complete so that the treated liquid needs to be subjected to a further separation step, as in a filter, to remove last traces of the reagent solution. The treated liquid may be conducted by line 35 through a sand filter 36 to remove remaining reagent. The filtered liquid is withdrawn through line 37 to storage or other utilization, not shown. The cadmium sulfate solution recovered in the sand filter is conducted through line 38 to regeneration vessel 45. If desired the sulfate solution may be washed from the sand filter by small quantities of water or dilute acid introduced through line 39. The cadmium sulfate solution or a portion thereof may be withdrawn from the settling chamber by line 41 and introduced into the regenerating vessel 45 where the reagent is regenerated, as described above, by heating the cadmium sulfate solution containing cadmium sulfide by means of a heater, such as steam coils 46. Again, the cadmium sulfide is converted into cadmium sulfate. Water vapor and hydrogen sulfide pass out through line 47 and make-up water may be added through line 48. Regenerated cadmium sulfate is conducted through line 49, cooler 50 and line 51 to reagent recycle line 32. Recycle reagent in line 32 may be passed through a heater (not shown) to maintain desirable reaction temperature in the reaction-mixer.

Various valves, pumps, and other equipment necessary for the successful performance of the invention will be obvious to one skilled in the art and have been omitted for clarity of description. Also, other apparatus than that illustrated may equally well be employed in the practice of the invention. It is also understood that the materials of construction used in the apparatus in contact with the treating solution shall be resistant to the corrosive action of sulfuric acid of the strength used.

As an example of the invention, a natural gas containing about 35 grains of hydrogen sulfide per 100 cubic feet of gas is contacted countercurrently with a solution of cadmium sulfate in 50 weight per cent sulfuric acid in a packed absorption tower operated at about 80° F. The gas removed from the tower is substantially free of hydrogen sulfide. The spent cadmium sulfate solution is regenerated by boiling at atmospheric pressure, is cooled to approximately 75° F., and is then recycled to the absorption tower.

In another example of the application of the present invention, a 44.2° A. P. I. kerosene, boiling between 350 and 460° F. and containing 0.08 per cent sulfur as hydrogen sulfide after a catalytic desulfurization treatment, is contacted with a solution of cadmium sulfate in 40 weight per cent sulfuric acid. The hydrogen sulfide is completely removed and the spent cadmium sulfate solution with the precipitated cadmium sulfide is regenerated by boiling the acidic solution at atmospheric pressure.

The examples are illustrative only and are not intended to limit the scope of the invention. Innumerable applications of the invention will be apparent to one skilled in the art and various modifications may be made without departing from the spirit of the invention as recited by the claims which are intended to cover all inherent novelty in the invention.

I claim:
1. A continuous process for removing hydrogen sulfide from a hydrocarbon fluid which comprises, continuously contacting said fluid with a pool of an absorbent medium consisting of a substantially saturated solution of cadmium sulfate in aqueous sulfuric acid containing from 25 to 75 weight per cent sulfuric acid at a temperature of from 0 to 150° F., continuously separating a resulting solution admixed with resulting cadmium sulfide from resulting treated hydrocarbon fluid, continuously regenerating said resulting solution and said admixed resulting cadmium sulfide in a step which consists of separately heating said resulting solution admixed with resulting cadmium sulfide to a temperature of from 200 to 300° F., thereby evolving and expelling hydrogen sulfide, continuously recycling a resulting solution containing resulting regenerated cadmium sulfate dissolved therein to said contacting step.

2. The process of claim 1 wherein said hydrocarbon fluid is a gaseous hydrocarbon material.

3. The process of claim 1 wherein said hydrocarbon fluid is a liquid hydrocarbon material.

HOWARD R. SAILORS.

REFERENCES CITED

The following references are of record in the file of this patent:

UNITED STATES PATENTS

| Number | Name | Date |
|---|---|---|
| 1,954,488 | Morrell | Apr. 10, 1934 |
| 1,954,886 | Morrell | Apr. 10, 1934 |
| 1,954,887 | Morrell | Apr. 17, 1934 |
| 2,288,749 | Schulze | July 7, 1942 |

OTHER REFERENCES

Gregory et al., Textbook of Inorganic Chem., vol. III, Pt. II, Griffin and Co., London (1926), pp. 181–84.

Mellor, Modern Inorganic Chem., Longmans Green and Co., New York (1939), p. 647.